(12) United States Patent
Gossler

(10) Patent No.: US 10,437,656 B2
(45) Date of Patent: Oct. 8, 2019

(54) METHOD FOR AUTOMATICALLY DETERMINING CAUSES OF THE MALFUNCTION OF A SYSTEM MADE UP OF A PLURALITY OF HARDWARE OR SOFTWARE COMPONENTS

(71) Applicant: Inria Institut National De Recherche En Informatique Et En Automatique, Le Chesnay (FR)

(72) Inventor: Gregor Gossler, Saint Martin d'Heres (FR)

(73) Assignee: Inria Institut National De Recherche En Informa..., Le Chesnay (FR)

( * ) Notice: Subject to any disclaimer, the term of this patent is extended or adjusted under 35 U.S.C. 154(b) by 239 days.

(21) Appl. No.: 15/500,791

(22) PCT Filed: Jul. 31, 2015

(86) PCT No.: PCT/FR2015/052124
§ 371 (c)(1),
(2) Date: Jun. 14, 2017

(87) PCT Pub. No.: WO2016/016587
PCT Pub. Date: Feb. 4, 2016

(65) Prior Publication Data
US 2017/0308424 A1 Oct. 26, 2017

(30) Foreign Application Priority Data
Jul. 31, 2014 (FR) ...................................... 14 57464

(51) Int. Cl.
*G06F 11/00* (2006.01)
*G06F 11/07* (2006.01)
*G06F 11/36* (2006.01)

(52) U.S. Cl.
CPC ...... *G06F 11/0736* (2013.01); *G06F 11/0706* (2013.01); *G06F 11/079* (2013.01); *G06F 11/3608* (2013.01)

(58) Field of Classification Search
CPC ............... G06F 11/079; G06F 11/0706; G06F 11/0736; G06F 11/3608
See application file for complete search history.

(56) References Cited

U.S. PATENT DOCUMENTS 8,001,527 B1 * 8/2011 Qureshi ................. G06N 5/048
717/120
8,069,374 B2 * 11/2011 Panigrahy ........... G06F 11/0709
714/38.1
(Continued)

OTHER PUBLICATIONS

Gossler, Gregor, et al., "A General Trace-Based Framework of Logical Causality", Formal Aspects of Component Software, Lecture Notes in Computer Science, Jun. 13, 2014, pp. 157-173, vol. 8348.
(Continued)

*Primary Examiner* — Marc Duncan
(74) *Attorney, Agent, or Firm* — Maynard, Cooper & Gale, P.C.; Brian Sattizahn

(57) ABSTRACT

The invention relates to a method for automatically determining necessary or sufficient cause of a malfunction of a system made up of a plurality of hardware or software components. The method comprises, from the obtaining (22) of an execution trace including a sequence of events observed during the execution of the system, obtaining a tested subset of components comprising at least one component in which the execution trace has (24) at least one non-conformity with the specification of correct operation of said component and a subset of components processed in accordance with said tested subset of components; for a processed subset of components, a calculation, for each of the components of the system, of a prefix of an execution trace not affected by events that do not conform with the specification observed for the components of the processed subset of components, the determination of a counterfactual execution model of the processed subset making it possible to generate all of the possible behaviors, starting with the unaffected prefixes, in the absence of a malfunction of the components of the processed subset of components and the determination (28, 30) of the necessary or sufficient cause of
(Continued)

the components of the subset of components tested for the malfunction of the system in accordance with the verification that said counterfactual model of the processed subset of components complies with said global property of the system.

9 Claims, 8 Drawing Sheets

(56) References Cited

U.S. PATENT DOCUMENTS

| | | | | |
|---|---|---|---|---|
| 8,612,377 | B2* | 12/2013 | Beg | G06F 11/079 |
| | | | | 706/52 |
| 2002/0194393 | A1* | 12/2002 | Hrischuk | G06F 9/542 |
| | | | | 719/318 |
| 2003/0121027 | A1* | 6/2003 | Hines | G06F 11/362 |
| | | | | 717/135 |
| 2005/0137832 | A1* | 6/2005 | Yemini | G06F 11/2257 |
| | | | | 702/183 |

OTHER PUBLICATIONS

Wang, Shaohui, et al., "A Causality Analysis Framework for Component-Based Real-Time Systems", Advances in Communication Networking: 20th International Workshop, Sep. 1, 2014, pp. 285-303.

* cited by examiner

T'

| Supervisor | med | t | | high | | | | tr'-S |
|---|---|---|---|---|---|---|---|---|
| Plant | | t | inc | | t | | t | inc | tr'-P |
| Env | med | t | inc | high | t | high | t | inc | tr'-E |

T*

| Supervisor | med | t |     | high |  ~tr*-S |
|------------|-----|---|-----|------|---------|
| Plant      |     | t | inc |      |  ~tr*-P |
| Env        | med | t | inc | high |  ~tr*-E |

FIG.10

METHOD FOR AUTOMATICALLY DETERMINING CAUSES OF THE MALFUNCTION OF A SYSTEM MADE UP OF A PLURALITY OF HARDWARE OR SOFTWARE COMPONENTS

The present invention relates to a method for automatically determining causes of malfunction of a system composed of a plurality of hardware or software components and to an associated device.

The invention lies in the field of the analysis of the malfunctions of systems comprising several software or hardware components, or combining software and hardware components, which interact.

Diverse applications use interconnected hardware and/or software components, distributed over several sub-systems, and optionally embedded onboard. For example, in the field of medical equipment, treatment systems are composed of interconnected equipment, for example pacemakers or infusors connected to monitoring systems. In the field of transport, numerous control and monitoring systems implement interconnected components, such as for example speed regulators.

In complex systems such as these, it is important, in case of malfunction of the system, to automatically identify the cause of the malfunction, that is to say the system component or components responsible for the malfunction, so as to take appropriate measures, for example to restore the safety of use of the system, to identify the components to be recalled to the factory or to determine the responsibilities of the parties involved. Indeed, in certain systems such as medical systems or vehicle control and monitoring systems, a malfunction can have serious consequences and it is useful to determine the cause thereof automatically.

In distributed and complex systems, comprising several hardware and software components, it frequently happens, in case of malfunction of the system, that several components are seen to malfunction. In this case, determining the component or components which are actually the cause of the malfunction is all the more difficult.

The article "A general trace-based framework of logical causality" by G. Gossler and D. Le Métayer, published in FACS-10th International Symposium on Formal aspects of Component Software, 2013, presents a scheme for determining causality of malfunction of the components of a system.

This scheme requires the calculation of cones of influence between observed events, and uses an execution graph for implementation. It is complex from a calculational point of view and involves an over-estimation of the influence of the failures of certain components on the system as a whole. Moreover, this scheme is not suitable for the case of the analysis of the causes of malfunction of a real-time system.

In order to remedy the drawbacks of the existing schemes, the invention proposes, according to a first aspect, a method for automatically determining necessary or sufficient causality of malfunction of a system composed of a plurality of hardware or software components, each component having an associated specification of proper operation, said malfunction being observed in the form of the violation of a global property of the system during an execution of said system.

The method is implemented by a processor or a programmable circuit and characterized in that it comprises the steps of:

- for each of the components of the system, obtaining of an execution trace comprising a sequence of events observed during the execution of the system;
- obtaining of a tested subset of components comprising at least one component whose execution trace exhibits at least one non-compliance with the specification of proper operation of said component, and of a treated subset of components as a function of said tested subset of components;
- for a treated subset of components, obtaining of a set of prefixes of execution traces, each said prefix comprising events complying with the specification of proper operation of the associated component;
- calculation, for each of the components of the system, of an execution trace prefix not affected by events not complying with the specification that are observed for the components of the treated subset of components;
- determination of an execution model, termed counterfactual model of the treated subset, making it possible to generate the set of possible behaviors, beginning with the unaffected prefixes, in the absence of malfunction of the components of the treated subset of components;
- determination of the necessary or sufficient causality of the components of the tested subset of components for the malfunction of the system as a function of the verification of the compliance of said global property of the system by said counterfactual model of the treated subset of components.

Advantageously, the method of the invention makes it possible to determine one or more components whose malfunction is necessary or sufficient to cause a malfunction of the system in a system of components for which a specification of proper operation is known, by virtue of the generation of a counterfactual model, calculated on the basis of observed execution traces and able to generate execution traces complying with the specifications of proper operation of the components.

The method according to the invention can exhibit one or more of the characteristics hereinbelow.

The step of calculating, for each of the components of the system, an execution trace prefix not affected by events not complying with the specification that are observed for the components of the treated subset of components comprises:

a step of calculating, for each of the components of the system, an extension model making it possible to generate said execution trace prefix, and a step of compositing the calculated extension models.

The calculation of an extension model, for a given component, making it possible to generate an execution trace prefix comprises, for a said execution trace prefix comprising a number k of elements, the generation of a generating model making it possible to generate the first k−1 elements of said execution trace prefix and the combination of said generating model with a model complying with the specification of proper operation of said component.

The calculating step furthermore comprises a step of compositing the calculated extension models.

The calculation of an execution trace prefix not affected by events not complying with the specification that are observed for the components of the treated subset of components, uses a result of the composition of the calculated extension models.

The specification of proper operation of each component is modeled in the form of a finite state automaton model, the states of the model being related by transitions, said transitions being defined on the basis of said specification of proper operation.

The extension models and said counterfactual model are modeled in the form of finite state automatons.

To determine the necessary causality of said tested subset of components, said treated subset of components is equal to the tested subset of components and in the causality determination step, the tested subset of components is determined as necessary cause of malfunction of the system if and only if the counterfactual model determined complies with said global property of the system.

To determine the sufficient causality of said tested subset of components, said treated subset of components is equal to the subset of components complementary to said tested subset of components, and in the causality determination step, the tested subset of components is determined as sufficient cause of malfunction of the system if and only if the counterfactual model determined inevitably violates said global property of the system.

The method according to the invention applies in particular when the system comprises hardware components and/or software components.

According to another aspect, the invention relates to a device for automatically determining necessary or sufficient causality of malfunction of a system composed of a plurality of hardware or software components, each component having an associated specification of proper operation, said malfunction being observed in the form of the violation of a global property of the system during an execution of said system, comprising a processor or a programmable circuit. The device comprises units adapted to:
  for each of the components of the system, obtain an execution trace comprising a sequence of events observed during the execution of the system;
  obtain a tested subset of components comprising at least one component whose execution trace exhibits at least one non-compliance with the specification of proper operation of said component, and a treated subset of components as a function of said tested subset of components;
  for a treated subset of components, obtain a set of prefixes of execution traces, each said prefix comprising events complying with the specification of proper operation of the associated component;
  calculate, for each of the components of the system, an execution trace prefix not affected by events not complying with the specification that are observed for the components of the treated subset of components;
  determine an execution model, termed counterfactual model of the treated subset, making it possible to generate the set of possible behaviors, beginning with the unaffected prefixes, in the absence of the malfunctions of the components of the treated subset of components;
  determine the necessary or sufficient causality of the components of the tested subset of components for the malfunction of the system as a function of the verification of the compliance of said global property of the system by said counterfactual model of the treated subset of components.

According to another aspect, the invention relates to a computer program comprising instructions for implementing the steps of a method for automatically determining necessary or sufficient causality of malfunction of a system such as briefly presented hereinabove composed of a plurality of hardware or software components during the execution of the program by a processor or a programmable circuit of a programmable device.

According to another aspect, the invention relates to an information recording medium, characterized in that it comprises instructions for the execution of a method for automatically determining necessary or sufficient causality of malfunction of a system such as presented hereinabove composed of a plurality of hardware or software components, when these instructions are executed by a programmable device.

Other characteristics and advantages of the invention will emerge from the description thereof which is given hereinbelow, by way of wholly nonlimiting indication, with reference to the appended figures, among which:

Figure 3:
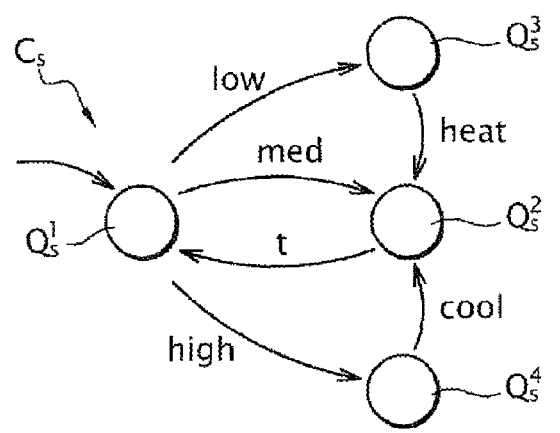
Figure 4:
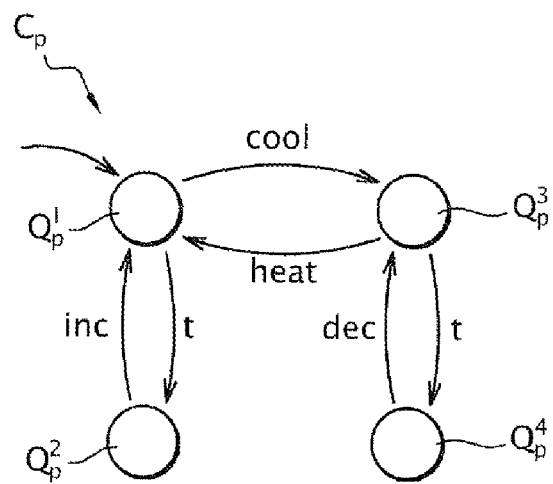
Figure 5:
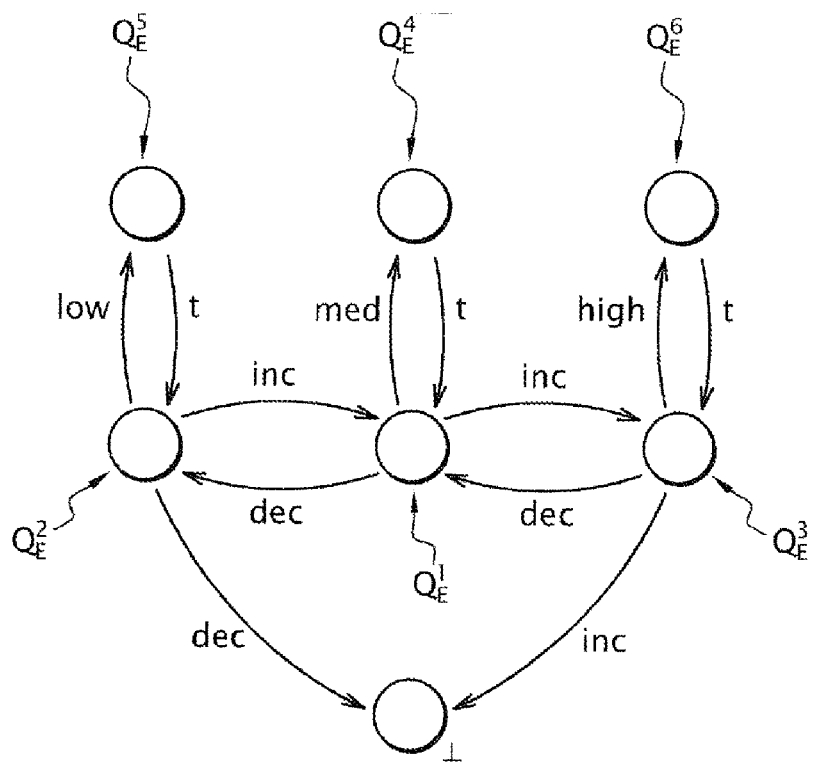
Figures 6, 7:
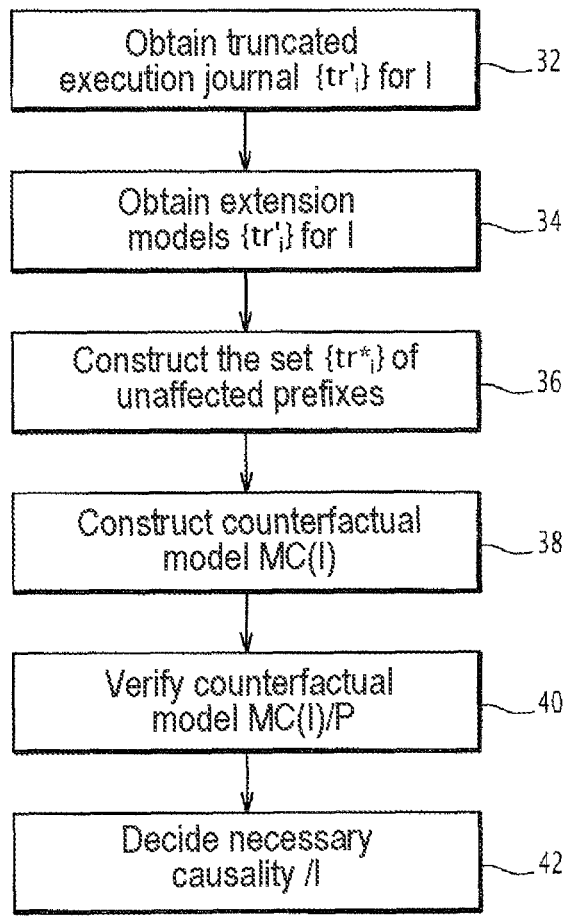
Figures 8, 9:
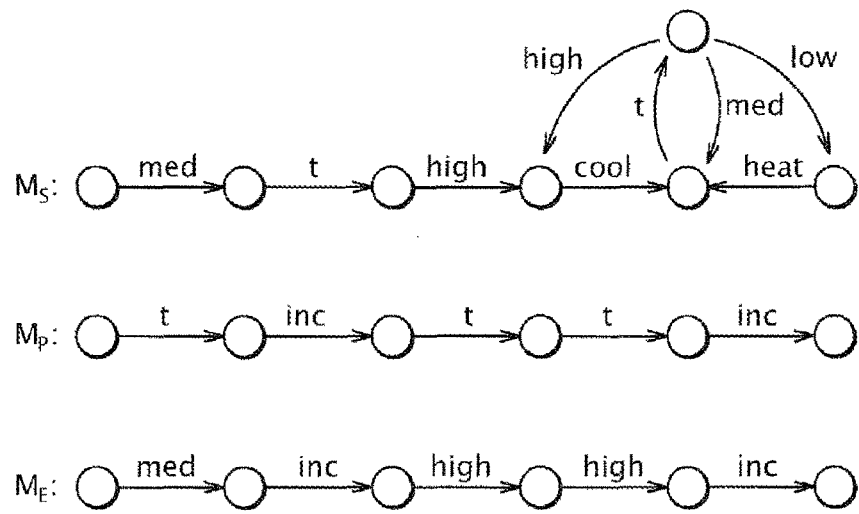
Figure 11:
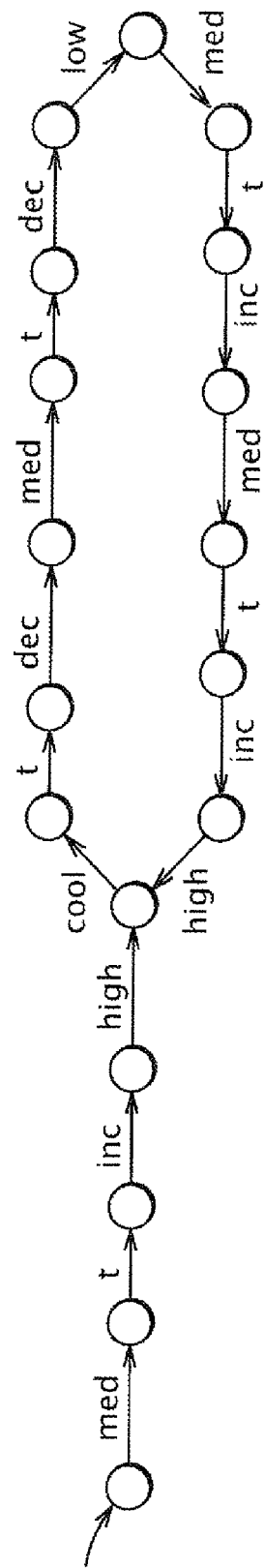
Figure 12:
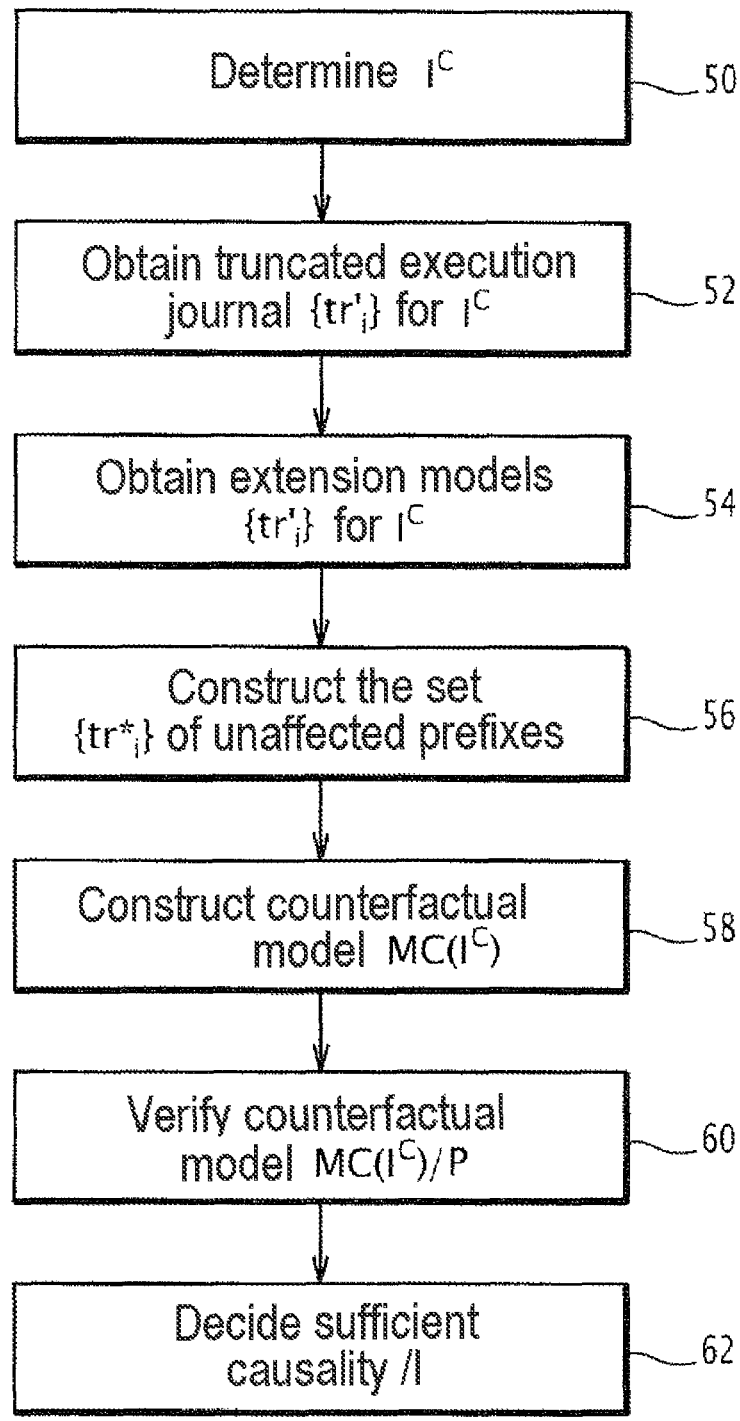

FIGS. 3, 4 and 5 schematically illustrate models for representing components according to an exemplary implementation;

FIG. 6 represents an exemplary execution trace of a system comprising components modeled according to the models of FIGS. 3 to 5;

FIG. 7 is a flowchart of a method for determining necessary causality according to an embodiment of the invention;

FIG. 8 represents a set of truncated execution traces;

FIG. 9 represents a plurality of extension models calculated on the basis of the truncated execution traces of FIG. 8;

FIG. 10 represents a set of unaffected execution prefixes calculated by applying the extension models of FIG. 8;

FIG. 11 schematically illustrates a calculated counterfactual model;

FIG. 12 is a flowchart of a method for determining sufficient causality according to an embodiment of the invention.

The invention will be described hereinafter in the general case of a system with multiple components, which will be illustrated by a schematic case of an industrial monitoring system.

It is understood that the invention is not limited to this exemplary application and can apply to any type of system based on components able to communicate with one another according to a given communication model.

The invention finds applications in particular in systems of medical equipment integrating software components, in systems embedded onboard vehicles or trains, in aeronautics and aerospace, in electrical substations, in energy distribution networks and in Web services.

The invention can be applied during or after the execution of a system. It can also be applied at the time of validation of a system; in this case it makes it possible to identify the components which have caused the malfunctions observed during tests.

In a particular application, the invention can be applied in the course of execution of a system when a malfunction is observed, thus allowing identification of the component or components that caused the malfunction.

Figure 1:
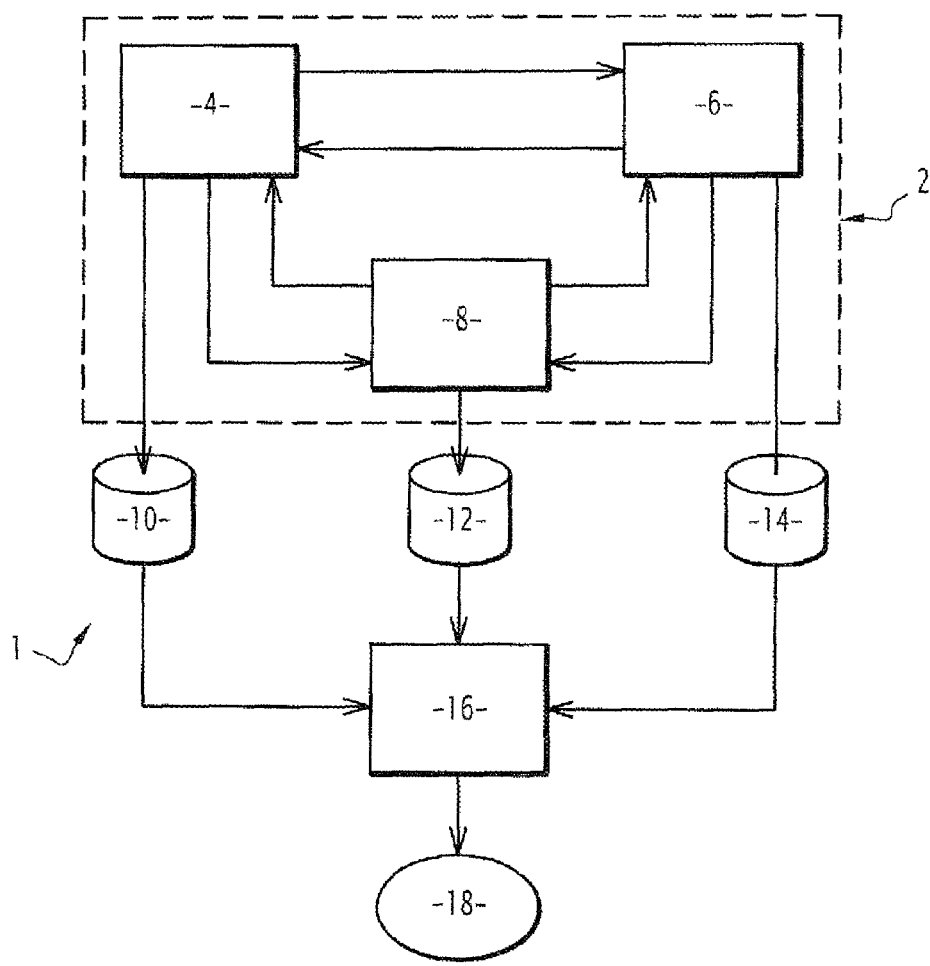
FIG. 1 is an exemplary system implementing the invention.

FIG. 1 illustrates a system 1 implementing the invention, comprising a communication system 2 with three components 4, 6, 8, which are able to communicate with one another by communication messages, represented by arrows in the figure. The number of components is limited to three in FIG. 1 to facilitate the explanation, but in practice, the invention makes it possible to treat an arbitrary number of components. Moreover, although the components 4, 6 and 8 illustrated in FIG. 1 are all connected to one another by emission/reception connections, such an architecture is not necessary, it being possible for the components to be connected to one another only partially.

For each of the components, a sequence of events is stored in an execution journal stored in a respective file 10, 12, 14. In the example of FIG. 1, each component has an associated execution journal, stored separately. As a variant, a single execution journal is stored for the whole set or a subset of the components of the system 2.

The components are considered to be "black boxes", of which only the inputs and the outputs are known, as well as a specification of proper operation, and it is this information which is useful for determining causality of malfunction.

Thus, the invention applies in a generic manner to any type of components which interact, each having an associated specification of proper operation.

The events and data stored in the execution journals pertain for example to communications, that is to say the messages dispatched and received, to function calls, to the writing and reading of shared variables, and/or to a summary of internal calculation steps such as for example the functions executed with the values of the parameters and the return values.

The stored execution journals, comprising the sequences of observed events for each component, are used thereafter in a device 16 for automatically determining causes of malfunction.

The device 16 implements a method for determining necessary and/or sufficient causality according to the invention, and indicates as output 18 one or more failed components from among all the components of the system. The device 16 is a programmable device and comprises in particular a processor or a programmable circuit able to implement modules for automatically determining causes of malfunction, necessary and/or sufficient, of the analyzed system.

Figure 2:
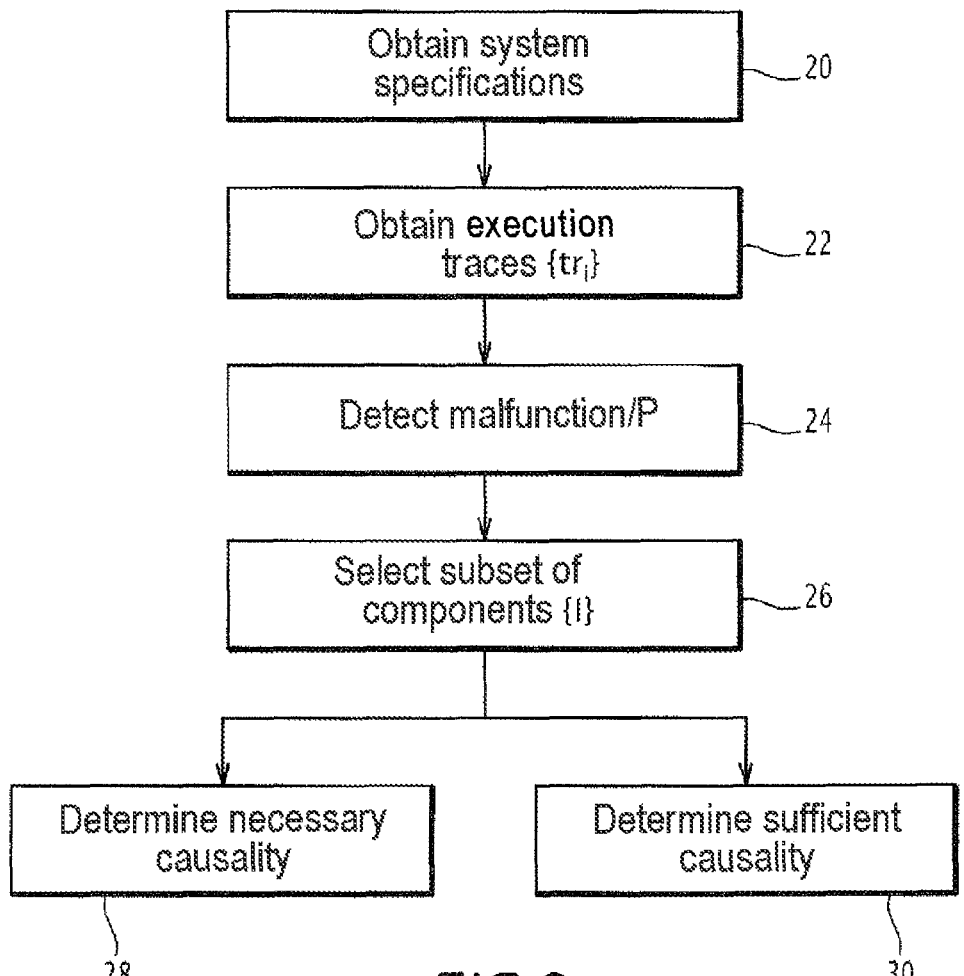
FIG. 2 is a flowchart of a method for determining necessary and/or sufficient causality of malfunction according to an embodiment of the invention.

FIG. 2 illustrates an embodiment of a method for determining necessary and/or sufficient causality of malfunction of a system according to the invention, in the case where a malfunction is observed, in the course of execution of the system or after execution of the system.

The method is implemented by a programmable device such as a computer, comprising in particular a programmable circuit or a processor able to execute control program instructions when the device is powered up and information storage means, able to store executable code instructions allowing the implementation of programs able to implement the method according to the invention.

For a system S comprising a plurality of n components of indices i, $i \in \{1, \ldots, n\}$, in a preliminary step 20 of characterizing the system, specifications of the system are obtained and stored.

Indeed, the method for determining causes of malfunction according to the invention uses a mathematical formalization of the behavior of a system, thus allowing an application with any type of system with hardware or software components.

The invention applies to any system behavior model, but will be described hereinafter in an embodiment, in which the behavior of such a system and of its components is modeled by a system of labeled transitions (labeled transition system, LTS). Computing tools exist for automatically performing the operations described hereinbelow on the LTS.

An LTS $B=(Q,\Sigma,\rightarrow,q_0)$ consists of a set of states Q, an alphabet of events $\Sigma$, a transition relation denoted $\rightarrow$, where $\rightarrow \subseteq Q \times \Sigma \times Q$ and $q_0$ an initial state.

We write $$q \xrightarrow{a} q'$$

for the triplet (q, a, q')$\in \rightarrow$ which represents a transition labeled by the event a between a first state q and a second state q'.

For a system S comprising a plurality of components, the specification of proper operation of each component i is given by an LTS $C_i=(Q_i,\Sigma_i,\rightarrow_i,q_i^0)$.

The model of proper operation of the system S is obtained through a composition of the models of the components of the system. The composition of models is denoted $\|$.

We write:

$$C = C_1 \| C_2 \| \ldots \| C_n = \left( Q_1 \times Q_2 \times \ldots Q_n, \bigcup_i \sum_i, \rightarrow, (q_1^0, q_2^0, \ldots, q_n^0) \right)$$

Where the transitions $\rightarrow$ are defined as follows:

$$\rightarrow = \{((q_1, \ldots, q_n), a, (q_1', \ldots, q_n')) \mid \forall i = 1, \\ \ldots, n: (a \in \Sigma_i \wedge q_i \xrightarrow{a}_i q_i') \vee (a \notin \Sigma_i \wedge q_i = q_i')\}$$

In other words, the alphabet of the composition of the models $C_i$ is the union of the alphabets of the models; C can perform a transition labeled by a if and only if all the models which have a in their alphabet are ready to make a transition a in their current state.

Let P be a global property of proper operation of the system S, whose violation constitutes a malfunction, such that if all the components of S satisfy their specification, then P is complied with.

In order to facilitate the explanation, let us consider the example of a system comprising three components: a factory Plant using a reactor whose temperature must be maintained at a certain level; a supervision component Supervisor which measures the temperature and which activates either a heating or a cooling; a component Env which models the evolution of the temperature as a function of the actions of the supervision component.

The system S is therefore made up of three components which are respectively the supervision component Supervisor, the factory with reactor Plant and the environment component Env.

FIGS. 3, 4 and 5 illustrate schematically, for the example treated, the specifications of proper operation of the components Supervisor, Plant and an environment model Env including a state, denoted $\perp$, indicating a violation of property of proper operation.

The operating model of the component Supervisor is illustrated in FIG. 3.

The component Supervisor interacts with the component Env to gather the current temperature of the reactor in the state $Q_S^1$.

If the temperature lies between predefined thresholds $T_{min}$, $T_{max}$, denoted med for medium temperature, the component Supervisor performs a transition med to a state $Q_S^2$, waits a timeout duration (transition t), and returns to the state $Q_S^1$; no action with the component Plant is required.

If the temperature sensed is less than the minimum threshold of proper operation, the component Supervisor performs a low transition to the state $Q_S^3$, followed by a transition heat to the state $Q_S^2$.

If the temperature sensed is greater than the maximum threshold of proper operation, the component Supervisor performs a transition high to the state $Q_S^4$, followed by a transition cool to the state $Q_S^2$.

From the state $Q_S^2$ the transition t performs the timeout and the return to the state a of sensed temperature reception.

The model associated with the component Plant is illustrated in FIG. 4, and shows the states and the transitions authorized according to the specification of proper operation of this component.

The component Plant is, in a first state $Q_P^1$, in a mode where the temperature of the reactor increases. The component Plant performs a transition t to the state $Q_P^2$ hence a transition inc, representing a temperature increase, makes it possible to go back to the first state $Q_P^1$.

In the case of a command cool received from the component Supervisor, the component Plant performs a transition to the state $Q_P^3$.

In the state $Q_P^3$, a transition t leads to the state $Q_P^4$, hence a transition dec makes it possible to go back to the state $Q_P^3$; this models a decrease in the temperature of the reactor at each time unit.

From the state $Q_P^3$, the state $Q_P^1$ can be reached by a command heat received from the component Supervisor.

The model of the component Env, equipped with a state denoted ⊥ which models a violation of correct operation, denoted ⊥ is illustrated in FIG. 5.

The component Env has six associated states of proper operation, denoted $Q_E^1$, $Q_E^2$, $Q_E^3$, $Q_E^4$, $Q_E^5$, $Q_E^6$.

The states $Q_E^1$ and $Q_E^4$ are associated with a sensed temperature Temp provided by sensors. If the temperature Temp is in the interval of proper operation [$T_{min}$, $T_{max}$], the state $Q_E^1$ is maintained by a sequence of transitions med (transmission of the temperature sensed at the Supervisor) followed by t.

In the case where the temperature decreases, the component passes to the state $Q_E^2$ through a transition dec. As long as the sensed temperature is less than $T_{min}$, the component remains in the states $Q_E^2$ and $Q_E^5$ (low transitions; t).

If the temperature increases, a transition inc to the state $Q_E^1$ is applied.

In the case where the sensed temperature in the state $Q_E^1$ increases, the component passes from the state $Q_E^1$ to the state $Q_E^3$ through a transition inc. As long as the sensed temperature is greater than $T_{max}$, the component remains in the states $Q_E^3$ and $Q_E^6$ (high transitions; t).

If the temperature dips, a transition dec from the state $Q_E^3$ to the state $Q_E^1$ is applied.

If the temperature decreases further (transition dec) in the state $Q_E^2$ or if the temperature increases further (transition inc) in the state $Q_E^3$, then the system is in violation of a property of proper operation and the state denoted ⊥ is reached.

Returning to FIG. 2, after the step of preliminary storage 20 of characterization of the system, an execution of the system providing an execution journal comprising a set of traces $tr_i$ for each of the components of the system is applied.

Indeed, during an execution of the system, each component has an associated execution journal, also called the trace of the component and denoted $tr_i$.

The execution journal comprises a sequence of observed events, each event corresponding to a transition between states of the component as defined hereinabove.

For each component, a first portion of the trace of the component is called a prefix of said trace. It is noted that a prefix of an execution trace is a truncation of the trace.

In the embodiment using an LTS model, for a formal definition, considering an LTS system B=(Q,Σ,→,$q_0$), an execution trace:

$tr=a_1 \cdot a_2 \cdot \ldots a_k$ is a sequence of events. It is accepted by B if there exists a sequence of transitions making B toggle from an initial state q to a state q' such that:

$$a \xrightarrow{a_1} q_1 \xrightarrow{a_2} \ldots \to q_{k-1} \xrightarrow{a_k} q',$$

the states $q_1, \ldots, q_{k-1} \in Q$.

According to one embodiment, the execution journals or traces $tr_i$ are stored during execution of the system and are read in a memory of the programmable device implementing the invention.

According to a variant, the execution journals or traces $tr_i$ are used in the course of execution of the system. When the causality analysis is performed in the course of execution, the sequences of events which have occurred until the time of the analysis are used.

In this embodiment, separate execution journals $tr_i$ are obtained for each of the components.

According to a possible variant, the execution traces $tr_i$ are recorded in one and the same file for all the components or for groups of components. In this case, step 22 comprises the extraction of the execution journals $tr_i$ per component on the basis of one or more such files recording sequences of events for several components.

The method of the invention is used when an execution of the system is incorrect, or, stated otherwise, when for the execution of the system a malfunction occurs, which is a non-compliance at the level of one or more of the global properties of the system P.

An exemplary execution journal of the system S taken as an example, the models of whose components are illustrated in FIGS. 3, 4 and 5, is illustrated in FIG. 6.

A table T illustrates respective execution traces of the components Supervisor, Plant, Env, denoted tr_S, tr_P, and tr_E.

In this example, the execution trace tr_S of the component Supervisor comprises an event which does not comply with the model illustrated in FIG. 3: this is the event t encircled in the table T.

Indeed, complying with the model of FIG. 3, an event high ought to be followed by an event cool and not by a timeout t.

Likewise, the execution trace tr_P of the component Plant comprises an event which does not comply with the model illustrated in FIG. 4: this is the event t encircled in the table T.

Indeed, complying with the model of FIG. 4, it is not possible to encounter two successive transitions t.

Thus, the system S exhibits a malfunction and a violation of the specification, since for the component Env, the transition high is followed by inc, this being contrary to the global property of proper operation (see FIG. 5).

Returning to FIG. 2, step 22 of obtaining execution traces is followed by a step 24 of detecting malfunction, that is to say of non-compliance with a global property P of the system, which applies whatever the modeling of the behavior of the system.

In case of malfunction detection in step 24, this step is followed by a step 26 of selecting a subset I of components, each comprising an execution trace comprising an event not complying with the model.

The subset $I=\{i_1, \ldots, i_R\}$ comprises R indices, $R \geq 1$, and $R \leq N$, being the total number of components of the observed system S.

The subset I of components is the subset whose necessary and/or sufficient causality in relation to the observed malfunction is tested, and is called the tested subset of components.

The method analyses the joint causality of the components of the tested subset I.

It should be noted that the scheme of the invention is applicable theoretically with a subset I of components comprising no non-compliance in the execution trace, but such a case is of no interest in practice. Indeed, the objective of the scheme is to determine which component or components of the system studied is the cause of the observed malfunction.

Thereafter, the steps 28 of determining necessary causality of the components of the subset I and 30 of determining sufficient causality of the components of the subset I are implemented.

These steps can be implemented substantially simultaneously or sequentially.

As a variant, just one of the steps of determining necessary causality 28 or of determining sufficient causality 30 is implemented for a tested subset of components I.

Thus, the invention makes it possible to determine, by testing several subsets of components I, in a precise manner, the components whose malfunction is necessary and/or sufficient in order to note the global malfunction of the system with respect to the property P.

FIG. 7 illustrates an embodiment of the step of determining necessary causality of the subset I of components.

The method schematically illustrated in FIG. 7 is implemented by a programmable device such as a computer, comprising in particular a programmable circuit or a processor able to execute control program instructions when the device is powered up and information storage means, able to store executable code instructions allowing the implementation of programs able to implement the method according to the invention.

During a first step 32, considering the subset of components I, a truncated execution journal is obtained.

It should be noted that for the determination of the necessary causality of the tested subset of components, steps 32 to 40 are applied to this subset of components, as explained hereinbelow.

For each component of index $i_k \in I$, the execution trace $tr_{i_k}$ is truncated so as to retain only the prefix $tr'_{i_k}$ complying with the model of the component $C_{ik}$.

In practice, the prefix $tr'_{i_k}$ comprises the sequence of events of $tr_{i_k}$ which precedes the event not complying with the detected model, also called the error with respect to the execution of the component considered.

For each component of index $i_j \in I^c$, where $I^c$ is the complementary subset of indices of subset I, the execution traces are unchanged: $tr'_{i_j} = tr_{i_j}$.

FIG. 8 illustrates the truncated execution journal, represented in a table T', for the example developed and for the subset I comprising the component Supervisor.

As seen in FIG. 8, the prefix tr'_S comprises only the first three elements of the execution trace tr_S for the component Supervisor, and the traces/prefixes tr'_P and tr_E are unchanged for the other two components.

Thereafter, during a step 34 of obtaining extension models, for each of the prefixes $tr'_i$ of the truncated execution journal, an extension model is determined, making it possible to generate the set of execution traces comprising the prefix $tr'_i$ and complying with the model of the component Ci.

In the embodiment using an LTS model, for a trace $tr=a_1 \cdot a_2 \cdot \ldots \cdot a_k$, we denote by T(tr) an LTS model making it possible to exactly generate the trace tr, called the generating model of tr.

The generating model T(tr) is defined as follows:

$$T(tr) = (\{q_0, \ldots, q_k\}, \{a_1, \ldots, a_k\}, \{(q_i, q_{+1}, q_{i+1}) | 0 \leq i \leq k-1\}, q_0)$$

We denote by M(tr) the extension model of a trace $tr=a_1 \cdot a_2 \cdot \ldots \cdot a_k$.

According to one embodiment, the extension model of a trace $tr=a_1 \cdot a_2 \cdot \ldots \cdot a_k$ complying with the LTS model $B=(Q, \Sigma, \rightarrow, q_0)$ is defined by the extension model obtained on the basis of the generating model of the prefix $tr'=a_1 \cdot a_2 \cdot \ldots \cdot a_{k-1}$ and of the model B. We write $T(tr')=(Q', \Sigma', \rightarrow', q'_0)$.

We write the extension model of the trace $tr=a_1 \cdot a_2 \cdot \ldots \cdot a_k$ and of the model B Refine $\underline{B}(tr)=(Q'', \Sigma', \rightarrow'', q'_0)$, with:

$$Q'' = Q \cup Q' \text{ and } \rightarrow'' = \rightarrow \bigcup \rightarrow' \bigcup \left\{ (q_{k-1}, a_k, q) \middle| q_0 \overset{tr}{\rightarrow} q \right\}$$

The extension model of the trace $tr=a_1 \cdot a_2 \cdot \ldots \cdot a_{k-1} \cdot a_k$ is obtained by composition of the generating model $T(tr_p)$ of the prefix $tr_p$ of the trace tr, corresponding to the trace tr without its last event $a_k$ and of the set of transitions complying with the model B making it possible to pass from the state $q_{k-1}$ of the generating model $T(tr_p)$ to a state q of the model B.

If, on the contrary, a prefix $tr_p$ of the trace tr of a component does not comply with its model of proper operation, then its extension model is equal to the generating model $T(tr_p)$.

For certain components a behavioral model, which represents all the possible, correct and erroneous behaviors of the component, may be known. Let $B_i$ be the behavioral model of the component of index i, and $S_i$ its model of proper operation (therefore, the behaviors of $S_i$ are included in those represented by $B_i$). According to an embodiment other than that presented hereinabove, the extension model $M(tr_p)$ of tr is calculated as Refine_$S_i(tr_p)$ when $tr_p$ is compliant with $S_i$; $M(tr_p)$ is calculated as Refine_$B_i(tr_p)$ when $tr_p$ is not compliant and a behavioral model B, is available; $M(tr_p)$ is calculated as $T(tr_p)$ when tr is not compliant and no behavioral model of the component i is known.

The obtaining of the trace extension model applies whatever the modeling of the behavior of the system.

It should be noted that the obtaining of an extension model for a trace tr explained hereinabove is applicable in an analogous manner to any prefix of a trace tr, insofar as a prefix of a trace is also a truncated trace, comprising fewer elements than a complete trace tr.

Thus, in step 34 of generating extension models, an extension model $M_i$ ($tr'_i$) is obtained for each prefix $tr'_i$ of the truncated execution journal.

FIG. 9 illustrates the extension models $M_S$, $M_P$, $M_E$ obtained on the basis of the prefixes of the truncated execution journal illustrated in FIG. 8.

The notation is analogous to the notation of FIGS. 3, 4, 5 and is not re-explained in detail here.

As illustrated in FIG. 9, for the respective components Plant and Env, the extension models are in fact the generating models of the respective traces tr'_P and tr'_E.

For the component Supervisor, the extension model is a combination of the generating model of the trace tr'_S, stripped of the last transition {high} (we write tr'_S\{high}), and of the transition high to the corresponding model $C_S$ illustrated in FIG. 3.

Step 34 of generating extension models is followed by a step 36 of constructing a set of prefixes that are not affected by the error or the errors of the components of the subset I, denoted $\{tr^*_i\}$.

The construction of this set is carried out by truncation of all the prefixes $\{tr'_i\}$ obtained in step 32 as a function of the combination of the extension models calculated in step 34.

The combination of the extension models $M_i(tr'_i)$ calculated in step 34 provides a model:

$$M = M_1(tr'_1) \| M_2(tr'_2) \| \ldots \| M_n(tr'_n)$$

Two embodiments are envisaged for step 34.

According to a first embodiment, the truncation is performed simultaneously: for each i=1, . . . , n.

We obtain $tr^*_i$ as the longest prefix of $tr'_i$ which can be produced by $M_i(tr'_i)$ in the composition:

$$M_1(tr'_1) \| \ldots \| M_{i-1}(tr'_{i-1}) \| T(tr^*_i) \| \ldots \| M_n(tr'_n) \| B$$

Where B is a behavior model for the global system.

Combination with B is optional.

According to a second embodiment, the components are considered in a predetermined order, for example the ascending order of the indices; after the obtaining of each unaffected prefix its extension model is updated in the composition before calculating the unaffected prefix of the following trace.

FIG. 10 illustrates the set T* of unaffected prefixes $\{tr^*_i\}$ obtained in the exemplary embodiment, obtained by using the extension models of FIG. 9 according to the first embodiment of step 36 described hereinabove.

The set T* obtained is the set of prefixes of maximum length that might have been observed in the absence of the execution errors of the system S.

Returning to FIG. 7, step 36 of constructing the set of unaffected prefixes is followed by a step 38 of constructing a model MC(i), called the counterfactual model, constructed with respect to the subset of components I. The model MC(I) is obtained by composition of the extension models of each of the unaffected prefixes $\{tr^*_i\}$, dependent on the respective LTS models of each of the components.

For a component of index i, we denote by $B_i(tr^*_i)$ the corresponding extension model, obtained as explained hereinabove in step 34.

The counterfactual model MC(I) is the composition of the extension models $B_i(tr^*_i)$ with the system's global behavior model B:

$$MC(I) = B_1(tr^*_1) \| B_2(tr^*_2) \| \ldots \| B_n(tr^*_n) \| B$$

As a variant, the counterfactual model MC(I) is the composition of the extension models $B_i(tr^*_i)$ without the system's global behavior model B.

The counterfactual model MC(i) is a model of the dummy execution traces, which might have been observed in the absence of errors of the components of the subset I considered. Thus, the counterfactual model of the treated subset makes it possible to generate the set of possible behaviors beginning with the unaffected prefixes, in the absence of malfunctions of the components of the treated subset of components.

Thereafter, during the counterfactual model test step MC(I) it is verified whether the counterfactual model satisfies the property P which has not been complied with during the execution of the system S.

In the embodiment using an LTS modeling, a property P is also represented by an LTS model:

$$P = (Q_P, \Sigma, \to_P, q_P^0)$$

An observation model for the property P, denoted O(P), is constructed:

$$O(P) = (Q_P \cup \{\bot\}, \Sigma, \to'_P, q_P^0)$$

With $$\to'_P = \to_P \bigcup \{(q, a, \bot) \mid q \in Q \wedge a \in \Sigma \wedge \forall q' \in Q : \neg (q \xrightarrow{a} q')\}$$

Where the transition relation $\to$ is the transition relation of the tested model, here MC(I).

Stated otherwise, the transitions of the observation model comprise the transitions defined for the model of the property P and the transitions which, accepting an event which does not comply with the tested property, culminate in an error state.

The tested model MC(I) satisfies the property P if and only if there exists no state $q \in Q \times \{\bot\}$ such that $(q_0, q_P^0) \to^* q$ where $\to^*$ is the transitive closure of $\to$. Stated otherwise, the counterfactual model MC(1) satisfies the property P if no sequence of events generated by the model culminates in the error state $\bot$.

In practice, the satisfaction of the property P is verified by an attainability algorithm—such as implemented in model-checking software such as CADP ("Construction and Analysis of Distribution Processes", available on-line at the address http://cadp.inria.fr/), NuSMV (OpenSource software available on-line) and Uppaal (software developed by the University of Uppsala, Sweden and by the University of Aalborg, Denmark, available on-line)—which verifies whether the state $\bot$ is attainable.

As a function of the result of the step of verifying the satisfaction of the property P by the counterfactual model MC(I), a decision concerning the necessary causality of the errors of components of the subset I is rendered in step 42, whatever the modeling of the system.

If the counterfactual model MC(I) satisfies the property P, then it is decided that the errors of the components of the subset I are a necessary cause of malfunction of the system S.

If on the contrary the counterfactual model MC(I) generated does not satisfy the property P, then the errors of the components of the subset I are not a necessary cause of malfunction of the system S.

FIG. 11 illustrates the counterfactual model obtained for the example developed, considering the component Supervisor as subset of tested components.

The counterfactual model is obtained by composition of the extension models. The counterfactual model obtained satisfies the property P, thereby making it possible to deduce that the error noted in the execution trace of the component Supervisor is a necessary cause of the malfunction of the system.

FIG. 12 illustrates an embodiment of the step of determining sufficient causality of the subset I of components.

The method illustrated schematically in FIG. 12 is implemented by a programmable device such as a computer, comprising in particular a programmable circuit or a processor able to execute control program instructions when the device is powered up and information storage means, able to store executable code instructions allowing the implementation of programs able to implement the method according to the invention.

During a first step 50 of determining a complementary subset of components, a subset $I^c$ comprising the indices of the components of the system S and which do not form part of the subset I is determined.

The following steps 52, 54, 56, 58 are analogous to steps 32, 34, 36, 38 described previously, considering the subset $I^c$ as treated subset of components in place of the subset I.

On completion of these steps, a counterfactual model $MC(I^c)$ is obtained.

The verification step 60 consists in verifying whether the counterfactual model $MC(I^c)$ systematically violates the property P, therefore whether all the traces obtained in accordance with this model comprise a string of events that does not comply with P.

Such a verification is performed by the implementation of a systematic method called verification of inevitability—such as implemented in model-checking software such as CADP, NuSMV and Uppaal—of the violation of P.

If the counterfactual model $MC(I^c)$ inevitably violates the property P, it is determined in step 62 that the subset of components I is a sufficient cause of malfunction of the system.

If at least some of the traces that may be obtained by applying the counterfactual model $MC(I^c)$ satisfy P, then it is determined in step 62 that the subset of components I is not a sufficient cause of malfunction of the system.

The invention has been described hereinabove more particularly in an embodiment in which the system is modeled in the form of LTS.

In a variant, the behavior of the system and of its components is modeled by timed automatons.

The invention applies more generally to any modeling of a system and of its components which makes it possible to construct tools for:

constructing a model T(tr), the generating model of a trace tr;
constructing an extension model of the trace tr, in compliance with a given model B;
calculating a composition of given models $C_i$, $C=C_1 \| C_2 \| \ldots \| C_n$
verifying whether a trace tr can be produced by a model M, and whether a trace tr can be produced by a model M composited with the models of other components;
verifying the satisfaction of a given property P by a model;
verifying whether a system inevitably violates a given property P.

It should be noted that the invention has been illustrated by a simple example, so as to facilitate the understanding thereof.

The invention nonetheless applies to complex systems with multiple components, and makes it possible to determine, automatically and systematically, necessary and/or sufficient causes of malfunction in these complex systems.

The method described hereinabove with reference to FIG. 2 has been described for the analysis of a subset of the components, defined by indices I.

Generally, the method is usable in a systematic search for causality, in which all the events or sequences of events liable to be causes of a malfunction from among the observed events are analyzed. In this use, the method described is implemented for each subset I considered to be liable to be necessary and/or sufficient cause of malfunction, or for part of these subsets, and makes it possible to determine in particular the minimum subset of components whose observed behavior is a necessary and/or sufficient cause for the observed malfunction.

The invention claimed is:

1. A method for automatically determining necessary or sufficient causality of malfunction of a system composed of a plurality of hardware or software components, each component having an associated specification of proper operation, said malfunction being observed in the form of the violation of a global property of the system during an execution of said system, the method being implemented by a processor or a programmable circuit and characterized in that it comprises the steps of:

for each of the components of the system, obtaining an execution trace comprising a sequence of events observed during the execution of the system;

obtaining a tested subset (I) of components comprising at least one component whose execution trace exhibits at least one non-compliance with the specification of proper operation of said component, and a subset of components treated (I, $I^C$) as a function of said tested subset of components;

for a treated subset of components (I), obtaining a set of prefixes of execution traces, each said prefix comprising events complying with the specification of proper operation of the associated component;

calculation, for each of the components of the system, of an execution trace prefix not affected by events not complying with the specification that are observed for the components of the treated subset of components;

determination of an execution model, termed counterfactual model of the treated subset, making it possible to generate a set of possible behaviors, beginning with the unaffected prefixes, in the absence of malfunction of the components of the treated subset of components (I);

determination of the necessary causality or sufficient causality of the components of the subset (I) of components tested for the malfunction of the system as a function of the verification of the compliance of said global property of the system by said counterfactual model of the treated subset of components.

2. The method as claimed in claim 1, characterized in that the step of calculation, for each of the components of the system, of an execution trace prefix not affected by events not complying with the specification that are observed for the components of the treated subset of components comprises:

a step of calculation, for each of the components of the system, of an extension model making it possible to generate said execution trace prefix, and a step of compositing the calculated extension models.

3. The method as claimed in claim 2, characterized in that said step of calculating an extension model making it possible to generate said execution trace prefix depends on the correspondence between said execution trace prefix and a specification of proper operation of the corresponding component, and/or on a behavioral model of the corresponding component.

4. The method as claimed in claim 2, characterized in that the specification of proper operation of each component is modeled in the form of a finite state automaton model, the states of the model being related by transitions, said transitions being defined on the basis of said specification of proper operation.

5. The method as claimed in claim 4, characterized in that the extension models and said counterfactual model are modeled in the form of finite state automatons.

6. The method as claimed in claim 1, characterized in that, to determine the necessary causality of said tested subset (I) of components, said treated subset of components is equal to the tested subset (I) of components and in that in the causality determination step, the tested subset (I) of components (I) is determined as necessary cause of malfunction of the system if and only if the counterfactual model determined complies with said global property of the system.

7. The method as claimed in claim 1, characterized in that, to determine the sufficient causality of said tested subset (I) of components, said treated subset of components is equal to the subset ($I^c$) of components complementary to said tested subset (I) of components, and in that in the causality determination step, the tested subset (I) of components is determined as sufficient cause of malfunction of the system if and only if the counterfactual model determined inevitably violates said global property of the system.

8. A device for automatically determining necessary or sufficient causality of malfunction of a system composed of a plurality of hardware or software components, each component having an associated specification of proper operation, said malfunction being observed in the form of the violation of a global property of the system during an execution of said system, the device comprising a processor or a programmable circuit and an information recording medium, wherein the information recording medium comprises instructions that, when executed by the processor or programmable circuit, cause the device to:

for each of the components of the system, obtain an execution trace comprising a sequence of events observed during the execution of the system;

obtain a tested subset of components comprising at least one component whose execution trace exhibits at least one non-compliance with the specification of proper operation of said component, and a treated subset of components (I, $I^C$) as a function of said tested subset of components;

for a treated subset (I) of components, obtain a set of prefixes of execution traces, each said prefix comprising events complying with the specification of proper operation of the associated component;

calculate, for each of the components of the system, an execution trace prefix not affected by events not complying with the specification that are observed for the components of the treated subset of components;

determine an execution model, termed counterfactual model of the treated subset, making it possible to generate a set of possible behaviors, beginning with the unaffected prefixes, in the absence of malfunction of the components of the treated subset of components (I);

determine the necessary or sufficient causality of the components of the tested subset (I) of components for the malfunction of the system as a function of the verification of the compliance of said global property of the system by said counterfactual model of the treated subset of components.

9. A computer program product comprising instructions embodied on a non-transitory computer readable medium and executable by a processor or a programmable circuit of a programmable device to implement the steps of a method for automatically determining necessary or sufficient causality of malfunction of a system composed of a plurality of hardware or software components as claimed in claim 1.

* * * * *